United States Patent
Rohr et al.

(10) Patent No.: US 8,056,362 B2
(45) Date of Patent: Nov. 15, 2011

(54) METHOD AND DEVICE FOR PURIFYING HIGH MELTING ORGANIC RAW PRODUCTS OR COMPOUND MIXTURES BY MEANS OF FRACTIONATED MELTING CRYSTALLISATION FROM SOLVENT MIXTURES

(75) Inventors: Rodolfo Rohr, Campinas (BR); Ali Nikzad, Zurich (CH); Andrzej K. Kuszlik, Buchs (CH)

(73) Assignees: Sulzer Chemtech AG, Winterthur (CH); Resitec Participacoes Ltda, Campinas (BR)

( * ) Notice: Subject to any disclaimer, the term of this patent is extended or adjusted under 35 U.S.C. 154(b) by 979 days.

(21) Appl. No.: 11/988,627

(22) PCT Filed: Jul. 26, 2006

(86) PCT No.: PCT/CH2006/000391
§ 371 (c)(1),
(2), (4) Date: Jan. 11, 2008

(87) PCT Pub. No.: WO2007/012214
PCT Pub. Date: Feb. 1, 2007

(65) Prior Publication Data
US 2009/0209773 A1 Aug. 20, 2009

(30) Foreign Application Priority Data
Jul. 26, 2005 (CH) .................................. 1254/05

(51) Int. Cl.
*C07J 9/00* (2006.01)
*B01D 9/00* (2006.01)
(52) U.S. Cl. .......................................... 62/541; 552/544
(58) Field of Classification Search ........................ None
See application file for complete search history.

(56) References Cited

U.S. PATENT DOCUMENTS

| 3,649,708 A | 3/1972 | Schroeder |
| 4,420,427 A | 12/1983 | Hamunen |
| 4,672,218 A | 6/1987 | Chrisman |
| 5,961,935 A | 10/1999 | Lee |
| 6,664,419 B1 | 12/2003 | Bub |

FOREIGN PATENT DOCUMENTS

| EP | 0 646 399 A1 | 4/1995 |
| WO | WO 01/21572 | 3/2001 |

*Primary Examiner* — Kamal Saeed
(74) *Attorney, Agent, or Firm* — Francis C. Hand; Carella, Byrne, Cecchi et al (57) ABSTRACT

This invention relates to a method and a device for purifying and/or separating preferably high melting organic raw products or compound mixtures containing, in particular, high melting and/or degradable sterols, by layer crystallization on first heat exchanger surfaces. The raw product is received in a solvent or solvent mixture, and then brought into contact with heat exchanger surfaces. The desired product crystallizes on the heat exchanger surfaces by slow cooling. Solvent evaporating during the crystallization or sweating process is condensed and returned to the mixture.

39 Claims, 7 Drawing Sheets

METHOD AND DEVICE FOR PURIFYING HIGH MELTING ORGANIC RAW PRODUCTS OR COMPOUND MIXTURES BY MEANS OF FRACTIONATED MELTING CRYSTALLISATION FROM SOLVENT MIXTURES

FIELD OF THE INVENTION

This invention relates to a method and a device for purifying preferably high melting organic raw products or compound mixtures s by means of fractional layer crystallisation from solvent mixtures.

STATE OF THE ART

The purifying of organic compounds by means of fractional crystallisation on vertical heat exchanger surfaces—whether in a static crystalliser or in a dynamic falling film crystalliser—has been applied for several decades in the industry to obtain organic compounds on an industrial scale with a high degree of purity. One advantage of fractional crystallisation is that the use of a solvent may generally be dispensed with. A pre-purified mixture, already containing the desired compound in a high concentration, is very often used for fractionated crystallisation.

The use of solvents in fractional layer crystallisation is therefore undesirable because the efficiency of the processes would suffer. In particular, the energy balance is far more unfavourable because more energy is required for heating and cooling the mixture. Moreover, there is a risk that the purified product is still contaminated with traces of the solvent used. The purification of relatively high melting organic compounds, which melt at more than approx. 100° C., from solvents has never before been considered in industrial scale processes because in this case the solvent would at least partially evaporate. Because of the evaporation of the solvent, the composition and hence the separating properties of the mixture vary. However, a high safety risk due to associated increase in pressure would arise by evaporating solvents in addition to the undesirable emissions. Otherwise a very high design cost would be incurred if the crystallisers had to be designed and built for operation at such high pressures. Moreover, an upgrading of existing plants would not be possible.

U.S. Pat. No. 3,621,664 (Saxer) also discloses a method and device for the separation of substances from a liquid mixture. The device consists of a crystalliser with devices for forming a liquid film on cooling surfaces which can be heated or cooled by means of a heat transfer medium. This method is suitable for crystallising the required compound from the melt or from a solution containing the desired compound.

WO 00/45928 describes a method and a device for purifying compounds by means of crystallisation. During the crystallisation, a melt or a mixture containing essentially the required compound and impurities is crystallised on cooling surfaces. A sufficient quantity of a solvent is added to the melt for at least one compound tending to precipitation to be kept in solution. The solvent is added directly through a point of connection to the crystalliser. However WO 00/45928 indicates that as little solvent as possible should be added to the melt.

The crystallisation from solutions can only be applied in the crystallisation devices of prior art if the temperatures used during the crystallisation process are far lower than the boiling points of the solvents used. Otherwise undesirable evapo ration of the solvent already takes place during crystallisation and even during melting of the crystals. Undesired concentration gradients are produced in the solution mixture due to solvent evaporation, which has a disturbing effect on uniform crystallisation. It may also be the case that when crystallising compounds that melt at higher temperatures, the vapour pressure of the solvent used is already relatively high, so that the concentration of the dissolved compounds increases due to evaporation of the solvent without pronounced boiling.

U.S. Pat. No. 4,420,427 describes a method for obtaining sterols or sterol mixtures from non-saponifiable fractions of extracts of vegetable origin, particularly of neutral compounds of raw soap from the sulphate-cellulose process. In the method described the sterol fraction is dissolved in an alcohol/water mixture with heating, then cooled with the precipitation of sitosterol. This corresponds to a classic suspension crystallisation. The precipitated sitosterol is filtered off and the non-sterol compounds are eluted with acetone or an acetone/methanol mixture. U.S. Pat. No. 4,420,427 further discloses that a sitosterol mixture is obtained by using methanol as the solvent, which mixture has the following approximate composition: camposterol (4-5%), β-sitosterol (65-75%) and α-sitosterol (15-25%). This mixture can then be separated, for example, by fractional (suspension) crystallisation so that pure α-sitosterol is obtained. If pure β-sitosterol is to be obtained, the use of methyl ethyl ketone and water is recommended as the solvent. The disadvantage of the method, however, is that it is difficult to free the crystals completely of adhesive mother liquor by filtering or centrifuging. Moreover, the handling of the residue, transport of the solids and many moving parts is technically very expensive.

U.S. Pat. No. 6,344,573 describes a method for obtaining raw phytosterol in which the raw material is first saponified and the unsaponified fraction, which contains all the phytosterol, is then removed from the soap matrix by evaporation and high vacuum distillation. From this a mixture is obtained with an approximately 50% sterol content. In order to meet the requirements of the food and pharmaceutical industries, the raw phytosterol must be further concentrated and purified. The methods currently used are extraction and suspension crystallisation from suitable solvents followed by phase separation by means of filtering/centrifuging, or extraction with supercritical fluids.

U.S. Pat. No. 6,344,573 and U.S. Pat. No. 4,420,427 are incorporated in this application by reference.

Extraction with solvents is complex, since the available solvents are not sufficiently selective, thus a mixture of several solvents must be used. This requires extensive solvent recovery.

OBJECT OF THE INVENTION

On the basis of this state of the art the object of the invention is to propose a method and device, which are suitable for purifying relatively high melting mixtures/compounds, such as vegetable and animal sterols, from solvents. A further object, in particular, is to propose a method and device which are suitable for purifying high melting crude product mixtures or degradable (temperature sensitive) compounds or those, which tend to crystallise into unfavourable crystal forms. Yet another object is to provide a method and device for obtaining and purifying vegetable and animal sterols with a relatively high melting point.

DESCRIPTION

The object is achieved according to the invention by a method with the following method steps:

dissolving the raw product in a solvent or solvent mixture for preparation of a solution mixture of a desired composition, bringing the solution mixture into contact with first heat exchanger surfaces and allowing it to cool slowly so that a crystal layer is formed with the desired compound on the first cooling surfaces, and condensing the evaporating solvent during the dissolving and crystallisation processes and returning it to the original solution mixtures. The method according to the invention has the advantage that high melting compounds such as sterols, which cannot be crystallized from their melt, can be purified by means of fractional layer crystallisation. Unlike suspension crystallisation, the use of filters and centrifuges may be dispensed with. By the condensation of evaporated liquid it is possible to use conventional crystallizers, since they do not need to be designed for high pressure By the use of condensers, the pressure increase can be kept low during operation. Said pressure increase can be kept below 100 mbar and preferably below 50 mbar, values that are acceptable for conventional types of layer crystallizers. Because of the immediate condensation of evaporating solvent and its return to the mixture, the composition of the mixture is retained during the crystallisation and this does not give rise to any undesirable/disturbing concentration gradient. A further advantage is that compounds, which cannot be crystallised from the melt, or crystallise into unfavourable crystal shapes or tend to thermal degradation, can also be purified by this method. The method also has the advantage that relatively high melting compounds with a melting point of 80 degrees Celsius or higher, can also be purified. The method is therefore also suitable for crystallising compounds from solutions which contain an excess (in terms of weight) of solvent.

The solvent used may have a boiling point which is lower or higher than the melting point of the desired compound. Preferably, a low boiling solvent is used, in particular a solvent with a boiling point, which is lower than the melting point of the desired compound. This has the advantage that the solvent residue can more easily be removed from the crystals than in the case of high boiling solvents. Because of the simultaneous condensation of the solvent, at least during the crystallisation process, the original composition of the mixture can be maintained. In this connection it is appropriate to weigh the quantities of the added raw mixture and the added solvent, or to determine them by other means, e.g. by measuring the filling levels or by measuring and integrating the flow rates during transfer to the receiver vessel.

The solvent or solvent mixture is preferably received at a predetermined temperature, the raw mixture heated and melted, if necessary, then introduced into the received solvent or solvent mixture by a suitable method. In such a way, a very sudden and hefty evaporation of the solvent can be prevented if the boiling point of the solvent used is lower than the solidification point of the raw product or compound mixture to be purified. The solvent or solvent mixture is advantageously agitated or forced-circulated (e.g. pumping around) during the dissolution of the raw mixture. This may help preventing local superheating and excessive boiling of the received solvent. Solvent evaporating in the receiver vessel is preferably condensed and returned to it. This enables the concentration ratios to be kept largely constant.

According to a preferred method, turbulent mixing, particularly in the vicinity of the wall, is induced by controlled solvent boiling. This means that a sufficient quantity of thermal energy is supplied to the solution mixture to obtain a slight boiling and bubbling directly at the walls. Such operation considerably accelerates the dissolution of molten compounds that flocculate when introduced into the solvent that boils at lower temperature than the solidification point of that molten compound. The heat transfer medium is preferably guided in the heating jacket of the receiver in such a manner that the decrease of its temperature when passing through the jacket compensates for the variation in the boiling point of the solvent, which varies locally according to the depth below the liquid surface. Therefore sufficient thermal energy is supplied to the solution mixture to achieve a temperature gradient in the heating jacket to compensate accurately for the pressure dependence of the solvent boiling point. The advantage of this is that uniformly boiling takes place along the entire heated wall. At the same time the liquid is can be circulated to assist in the mixing of solvent and raw product to be dissolved.

The crystal layer is advantageously sweated after the non-crystallised residue (residual solution) is drained, and the remaining crystals are further purified (i.e. re-crystallized) in further stages. In this manner, final products of any levels of purity can be obtained. According to a preferred method the crystal layer from the first crystallisation stage is separated from the crystallisation surfaces (first heat exchanger surfaces) in the first crystallisation stage the crystal layer is separated from the crystallisation surfaces (first heat exchanger surfaces) by guiding solvent over it rather than by melting. The quantity of solvent is preferably determined primarily e.g. by weighing so that ultimately the mixture has the required composition for the next crystallisation stage. It is conceivable to carry out several first crystallisation stages, collect the sweated crystallisate and purify it in a second crystallisation stage after a sufficient quantity has been accumulated (also applies correspondingly to more than two stages).

Preferably, a sweating fraction from the second crystallisation stage is stored intermediately and later mixed with fresh raw product and solvent and purified in a new first crystallisation stage. Depending on the desired purity of the final product, the crystallisate (crystals) is preferably mixed with a suitable quantity of solvent so that a mixture of a composition suitable for the next crystallisation is produced, which mixture is then purified in a further (second) crystallisation stage.

A preferred variant provides that either cooling water or steam is conducted through the heat exchanger surfaces via a primary cooling/hot heating circuit, which is connected to the primary heat exchanger surfaces. The advantage of this is that the crystallisation, sweating and melting processes are always carried out with one and the same medium (secondary circuit) and are able to take place much more quickly because the heat transfer medium is already provided at suitable temperatures.

One possible application of the method according to the invention is the purification of mixtures containing phytosterols. Desired compounds, which are to be obtained in a high degree of purity include, for example, beta-sitosterol, stanol, phytostanol, their derivatives, particularly their ester derivatives, or sterols of animal origin. The undesirable compounds (impurities) to be separated from the raw compound mixture include, in these examples, campestanes, sitostanes, campestanones, sitostanones, fatty alcohols, alpha-sterols, fatty acids and other components, particularly chromatogenous components. The purification of raw sterol mixtures and the recovery of cholesterol, sitosterol, campostero, stigmasterol avenasterol or brassica sterol, or two or more of the above-mentioned compounds from a mixture containing further (undesirable) compounds, is also a further independent object of the invention in this application.

Ethanol and/or propanol is preferred as solvent for purifying sterol or phytosterol mixtures. The advantage of these solvents is that they can also be used in subsequent processes and do not therefore have a disturbing effect on the subsequent method steps. Advantageously, the solvent contained in the crystal layer is removed by evaporation prior to the melting of the crystals. In this way, it is possible to obtain almost solvent free products.

A further object of this invention is a device according to the preamble to claim 29, characterised in that a receiver and a solvent storage tank are provided, in that the first container for the raw product is connected to the receiver via a feed pipe, the solvent storage tank is connected by pipes to the receiver and to the crystalliser, the crystalliser is connected to second heat exchanger surfaces (condenser) and a condenser is provided in or on the receiver. The inventive crystalliser has the advantage, that compounds which formerly could not be crystallised from the melt, or crystallise into unfavourable crystal shapes, can now be purified by means of layer crystallisation on heat exchange surfaces. The range of application of the crystallisation device is considerably expanded since also low boiling solvents can be used. The second heat exchanger surfaces serve to condense any solvent evaporating during the crystallisation and return it to the crystalliser.

The second heat exchanger surfaces are advantageously arranged in the crystalliser. Such an arrangement is particularly suitable for static crystallisers. In this case the second heat exchanger surfaces can be provided in the head of the static crystalliser above the first heat exchanger surfaces. The second heat exchanger surfaces extent preferably essentially throughout the entire cross-sectional area of the crystalliser so that concentration gradients in the solution created by solvent evaporation are avoided since the condensed solvent is uniformly distributed over the surface of the solution used. However, it is also conceivable to attach an external condenser to the crystalliser.

The second heat exchanger surfaces, particularly those for dynamic crystallisers, are provided outside the crystalliser. The advantage of this is that uniform mixing takes place outside the crystalliser by circulating the solution. An arrangement of the second heat exchanger surfaces outside the crystalliser is ideal for dynamic crystallisers. Evaporating solvent may therefore be returned directly into the sump of the dynamic crystalliser.

A condenser is also advantageously provided on the receiver vessel. This enables evaporating solvent to be returned when dissolving a molten compounds. A condenser is also suitably provided on the solvent storage tank. This condenser enables the solvent still evaporating during condensing or melting of the crystals to be recovered.

A particularly preferred embodiment provides that a primary cooling/heating circuit is connected to the first heat exchanger surfaces, which circuit has a first and a second heating/cooling unit. The provision of two or more separate heating/cooling units has the advantage that the crystallisation, sweating and melting processes can be substantially accelerated when the heat transfer media are already present at temperatures required for those processes. The heating/cooling units may also be combined with suitable heat transfer medium storage vessels so that there is a sufficient store of heat transfer medium at each temperature and no process load peaks are therefore imposed to the primary heating/cooling units.

The primary cooling/heating circuit is advantageously provided with three energy units, namely a first energy unit for producing chilled water of a first low temperature, a second energy unit for producing cooling water of a second medium temperature, and a third energy unit for producing steam of a third high temperature.

The object of this invention is a method according to Claim 27, which can be used for purifying compound mixtures with a high melting points such as beta-sitosterol, stanol, phytostanol, their derivatives, particularly their ester derivatives, or sterols of animal origin. In these examples, the solidification points of the compounds to be purified are preferably higher than the boiling points of the solvents used.

A further object of this invention is a device according to Claim 37, which is characterised in that a receiver vessel is provided, which is equipped with a heating jacket at least partially enclosing the vessel body, so that liquid received in the vessel during operation can be heated, and in that a condenser is provided in or on the receiver for condensation of evaporating solvent. The advantage of this device is that higher melting compounds can be dissolved without the use of an agitator by generating a necessary degree of liquid agitation by controlled boiling. Moreover, the solvent can be forced-circulated, as already described more in detail above.

The invention is more detailed described in the following with reference to the figures showing an exemplary embodiment. In the figures the same reference numbers are used for the same parts.

Figure 1:
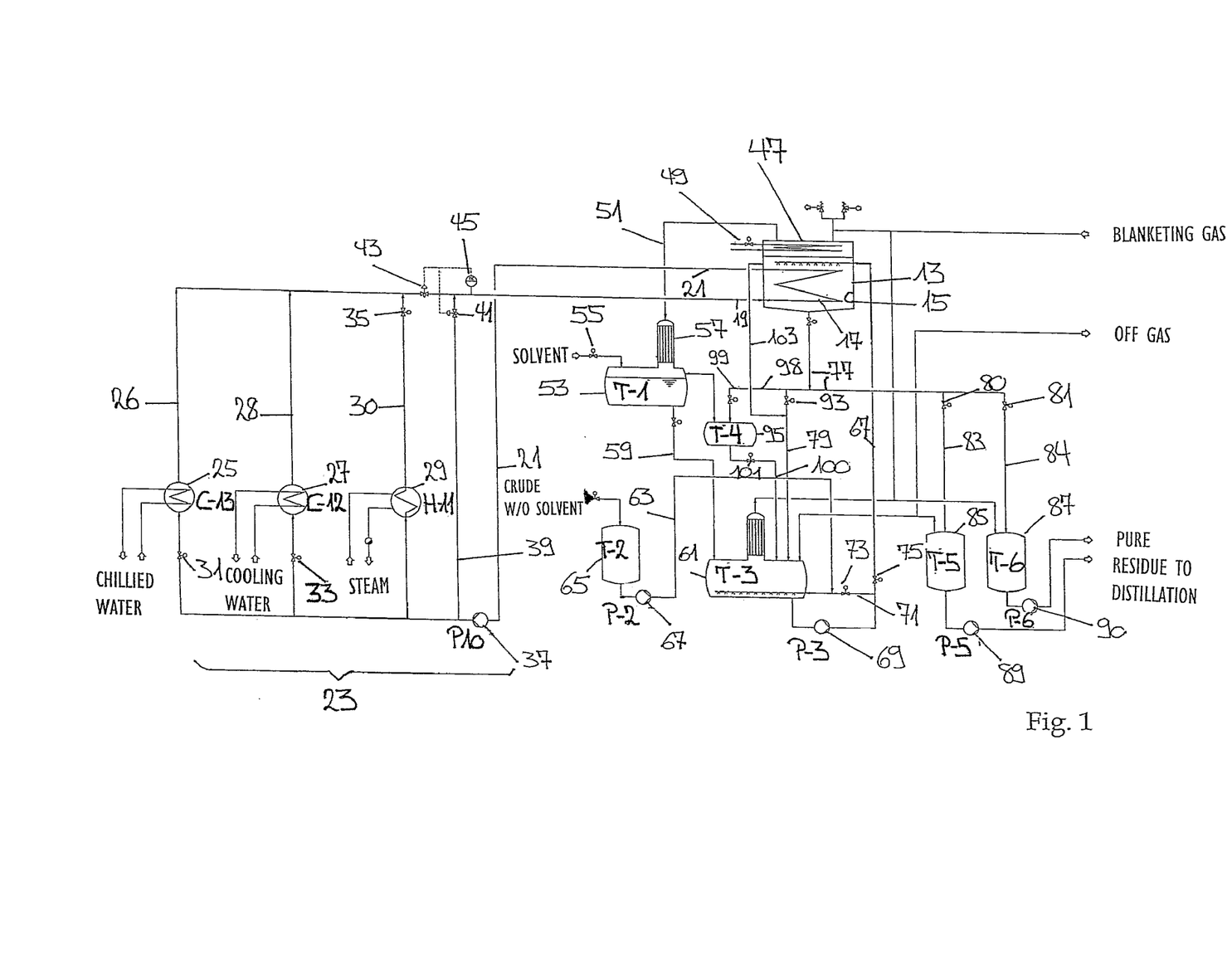
FIG. 1 shows an explanatory diagram of a first embodiment of a crystallisation device with a static crystalliser.

The exemplary embodiment of a crystallisation device 11, shown in FIG. 1, has a so-called static crystalliser 13 with first heat exchanger surfaces 17 arranged in crystallisation space 15, through which surfaces heat transfer medium flows during operation. Heat exchanger surfaces 17 are connected by pipes 19, 21 to a primary cooling/heating circuit 23. Cooling/heating circuit 23 has three energy units, namely a first unit 25 for chilled water, a second energy unit for cooling water of an average temperature, and a third energy unit for steam. The three energy units are connected by lines 26, 28, 30 and 19 to heat exchanger surfaces 17. The individual lines 26, 28 and 30 can be shut off by means of valves 31, 33, 35 so that the heat transfer medium of required temperature, from a particular energy unit can always be fed into the heat exchanger surfaces. A pump 37 connected to line 21 is used to convey the heat transfer medium through lines 19, 21, 26, 28 and 30. A bypass line 39, with valve 41, enables returning heat transfer medium to be mixed with heat transfer medium coming from the first, second or third energy units 25, 27, 29. In such a way, any temperature of the medium flowing to the crystallizer can be made up, ranging between the heat transfer medium temperatures of the coldest and the hottest energy unit. For this purpose a control circuit is provided comprising control/mixing valves 41 and 43 and a temperature measurement 45.

Second heat exchanger surfaces 45 are provided in the upper part of crystallisation space 15. These second heat exchanger surfaces 45 are connected to a second (secondary) cooling circuit 49 (not shown in greater detail in the figures). The cooling energy here may, for example, be obtained from one of the above-mentioned energy units—for chilled or cooling water.

Crystalliser 13 is connected by line 51 to a solvent storage tank 53. The solvent storage tank 53 serves to receive a solvent or a solvent mixture which can be fed via a supply line 55. A condenser 47 is provided on the solvent tank for condensing solvent vapour escaping from solvent tank 53 or from the crystalliser.

Solvent storage tank 53 is connected by line 59 to a receiver vessel 61. Receiver vessel 61 has a supply line 63, which is connected to a raw product tank 65. A feed pump 67 conveys the raw product from raw product tank 65 into receiver vessel 61 during operation. Supply line 63 enters the solution circulation line 71, or the receiver vessel 61 at the top.

Receiver 61 is connected by a up-load line 67 to crystalliser 13. A pump 69, connected to line 67, then serves to convey the received mixture into crystalliser 13. The up-load line 67 enters the crystallizer 13 at its upper part; where the received mixture can be uniformly distributed over the cooling surfaces via suitable distributors (for a more detailed description see below). The line 67 has a side branch, the solution circulation line 71 that is connected to the receiver vessel 61. The received mixture can be transferred to the crystallizer 13 by opening valve 75 and closing the 73, or it can be pumped around when valve 75 is closed and valve 73 is open. The pumping around can accelerate the dissolution of the raw product.

Crystalliser 13 is connected by a header 77 and a line 79 to receiver vessel 61. Additionally, the header 77 is connected by valves 80, 81 and lines 83, 84 to tanks 85 and 87, respectively. Here, the tank 85 serves to receive the crystallisation residue (residual solution), and tank 87 serves to receive the final product. During operation, the residue can be pumped (by pump 89) from tank 85 to another separation unit, preferably distillation, from where the recovered solvent is returned to the solvent tank 53.

The header 77 can be shut off by a shutoff valve 91. Liquid can be drained from crystalliser 13 either into receiver 61 or into tanks 85, 87, according to the position of valves 80, 81 or 93, respectively.

In the exemplary embodiment shown, an intermediate tank 95 is also provided. Intermediate tank 95 is also connected to the header 77 (line 98, valve 99) and is also connected by line 100 and valve 101 to the receiver vessel.

An overflow line 103, which is connected to the crystalliser just above heat exchanger surfaces 17, connects crystallisation space 15 to line 79. Mixture can drain from crystalliser 13 into receiver 61 through overflow line 103.

The piping system, which enables the individual tanks to be blanketed and flushed with an inert gas atmosphere, is denoted by reference number 155.

Figure 2:
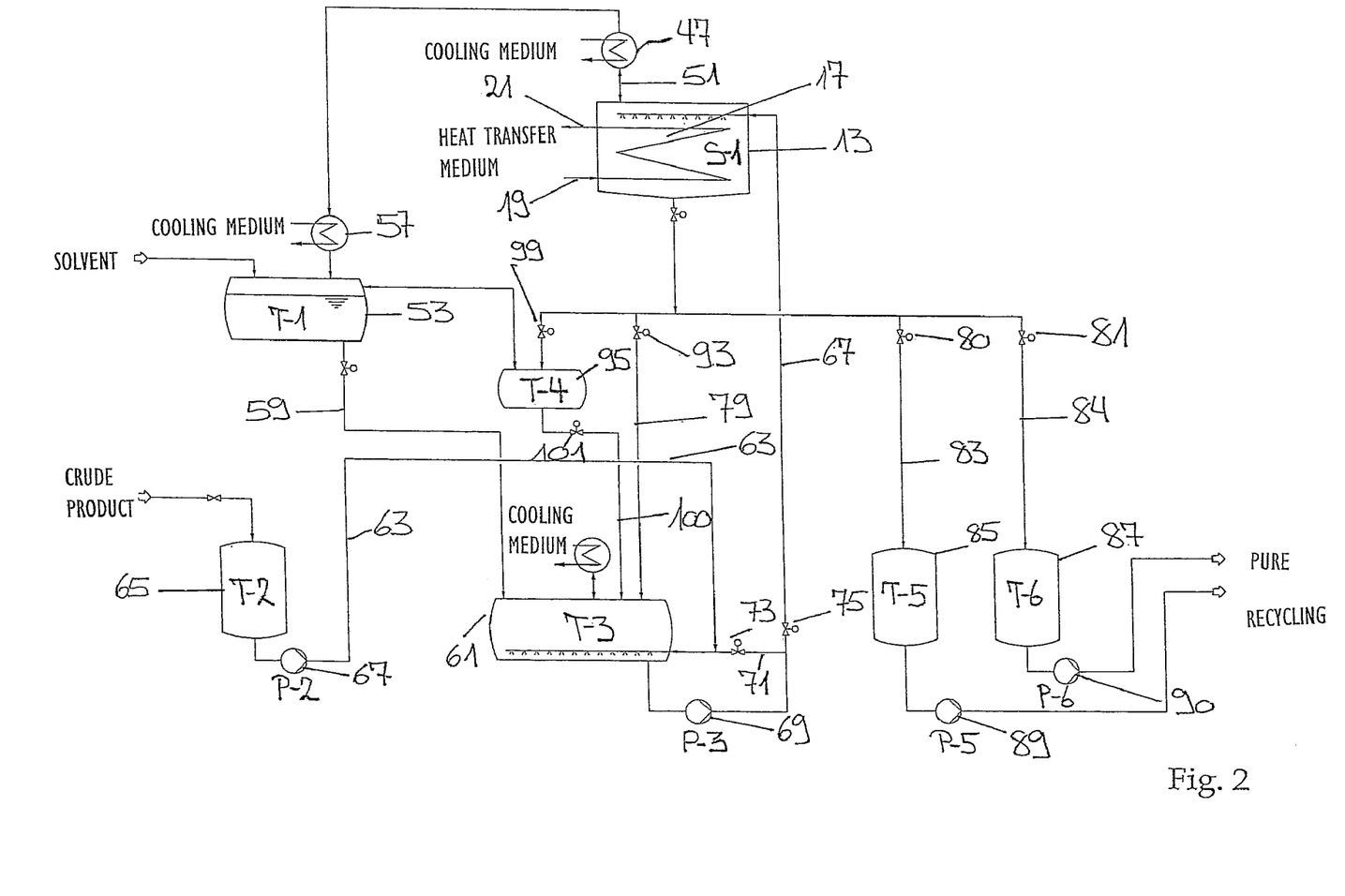
FIG. 2 shows part of the crystallisation device in FIG. 1 on an enlarged scale.
Figure 3:
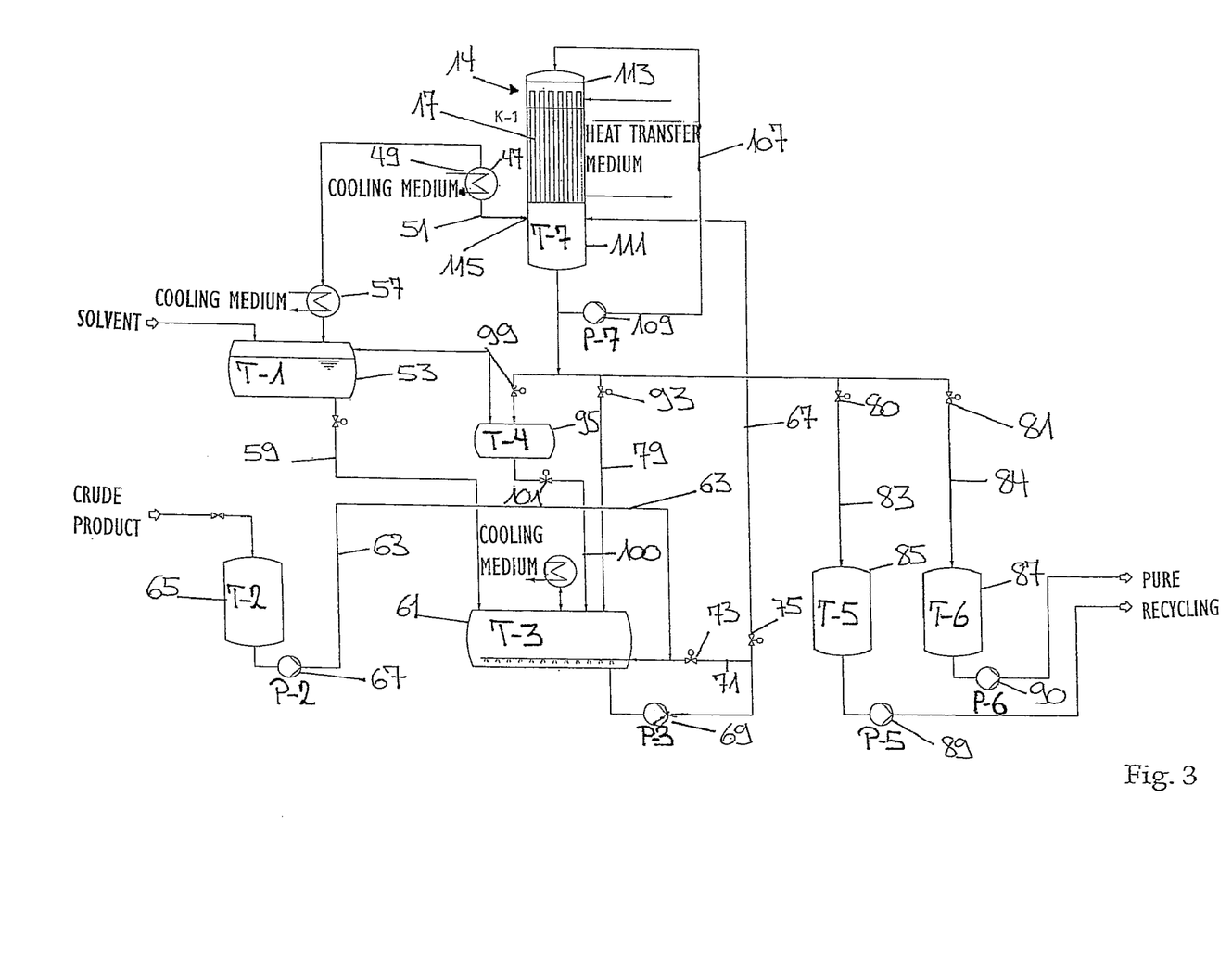
FIG. 3 shows crystallisation device, as shown in FIG. 2, but with a dynamic falling film crystalliser instead of a static crystalliser.

The exemplary embodiment shown in FIG. 3 differs from the device shown in FIGS. 1 and 2 in that instead of a static crystalliser 13, a falling film crystalliser 14 is provided. The falling film crystalliser has, in a manner of prior art, a product circulation line 107 with pump 109 for conveying the mixture to be crystallised in the circuit from sump 111 to head 113 of the crystalliser. Condenser 47 is provided outside crystalliser 14 and connection point 11 of condenser 47 is directly connected to the sump of the falling film crystalliser.

Figure 4:
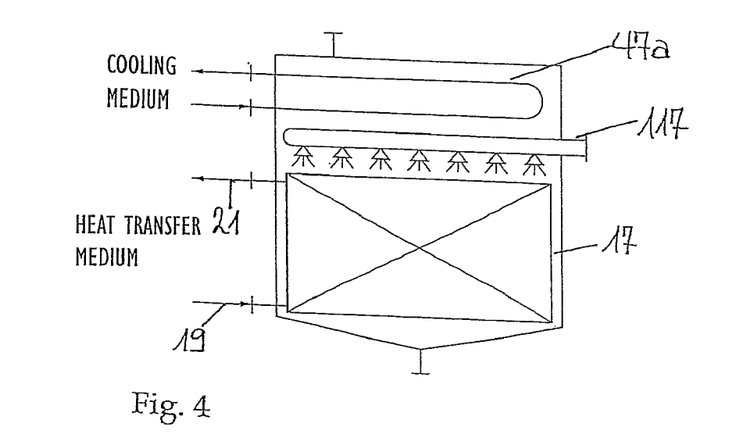
FIG. 4 shows a first example of a crystalliser with cooling coil arranged in the upper region of the crystallisation space.
Figure 5:
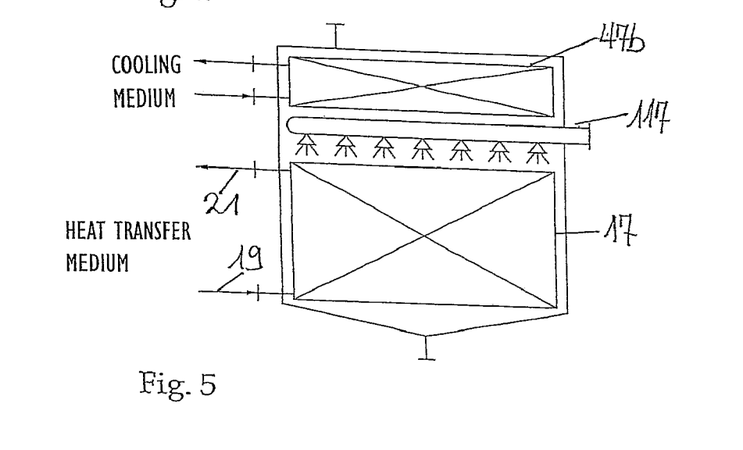
FIG. 5 shows a second exemplary example of a crystalliser with a plate heat exchanger arranged in the upper region of the crystallisation space instead of coil.
Figure 6:
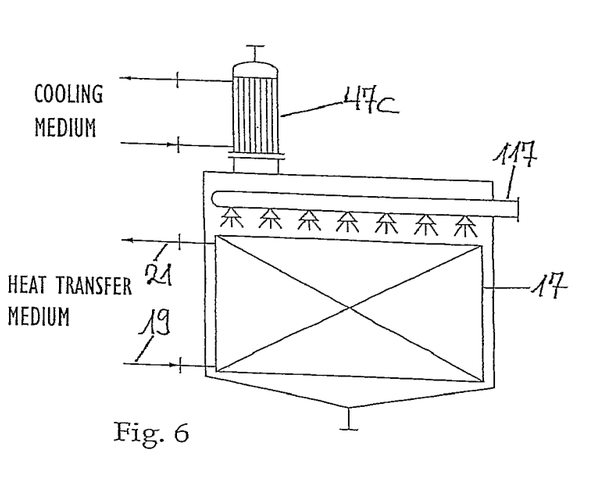
FIG. 6 shows a third exemplary embodiment of a crystalliser with an external heat exchanger (condenser) arranged on the top of the crystallizer.

Different designs of static crystallisers 13 are shown in FIGS. 4 to 6, which crystallisers have second heat exchanger surfaces 47a, 47b and 47c respectively, in different arrangements, above the first heat exchanger surfaces. Heat exchanger surfaces 47a and 47b may, for example, be designed as tube bundle 47a and plate bundle 47b, which are arranged in the crystalliser above first heat exchanger surfaces 17. However, it is also conceivable to provide an external condenser 47c, which may be flanged to the crystalliser and designed, e.g. as a shell & tube heat exchanger.

The static crystallisers used in an embodiment of the crystallisation device according to the invention are characterised in that liquid distributors 117 are provided directly above first heat exchanger surfaces 17. Liquid distributors 117 serve to distribute solvent or heated mixture uniformly over the first heat exchanger surfaces, thus enabling the adhering crystal layer to be removed from the crystallization surfaces by dissolving, without resulting in overheating.

Figure 7:
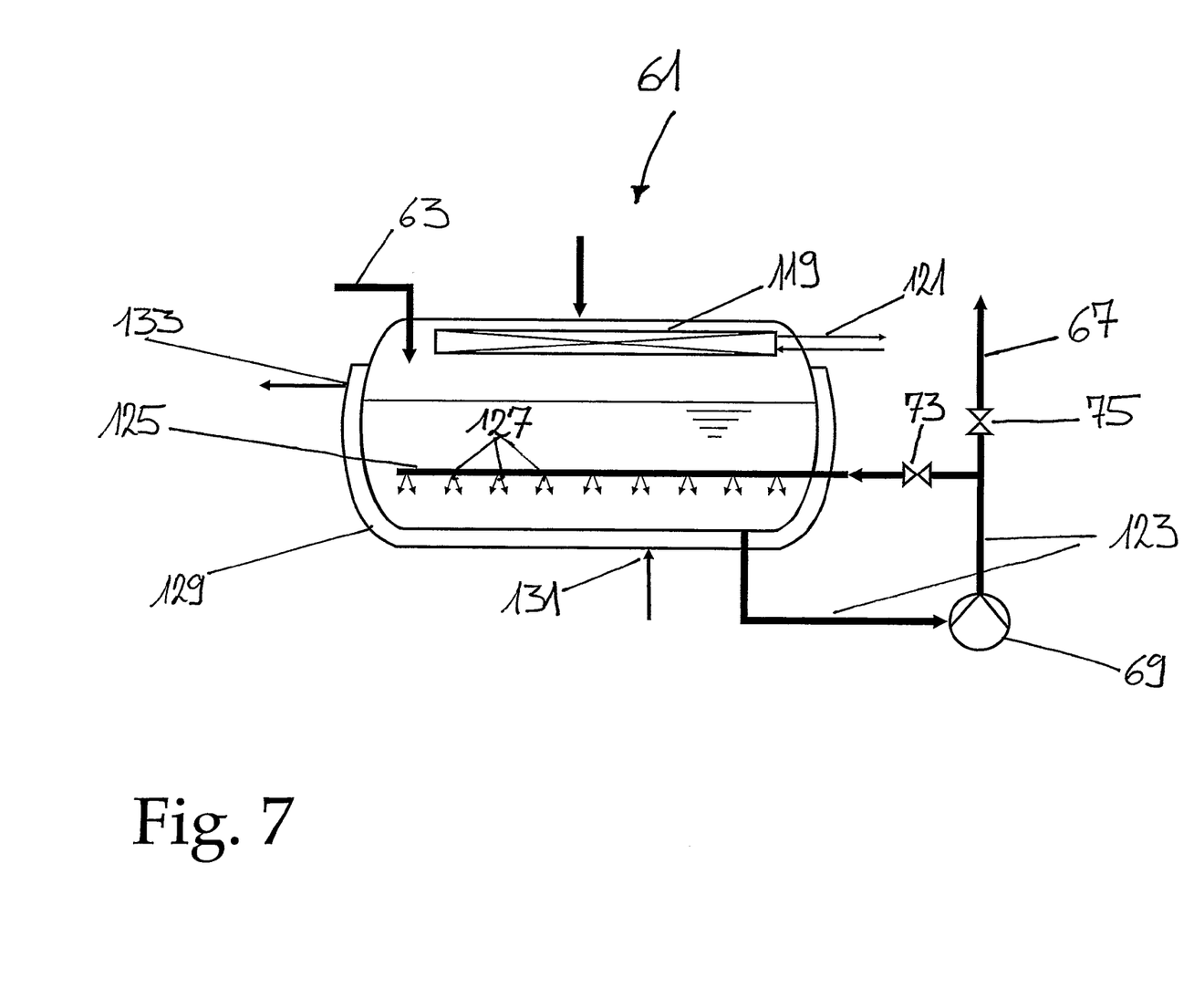
FIG. 7 Shows schematically an example of a receiver having a heating jacket and a condenser, in which receiver the raw product is introduced and dissolved in a received solvent.
Figure 8:
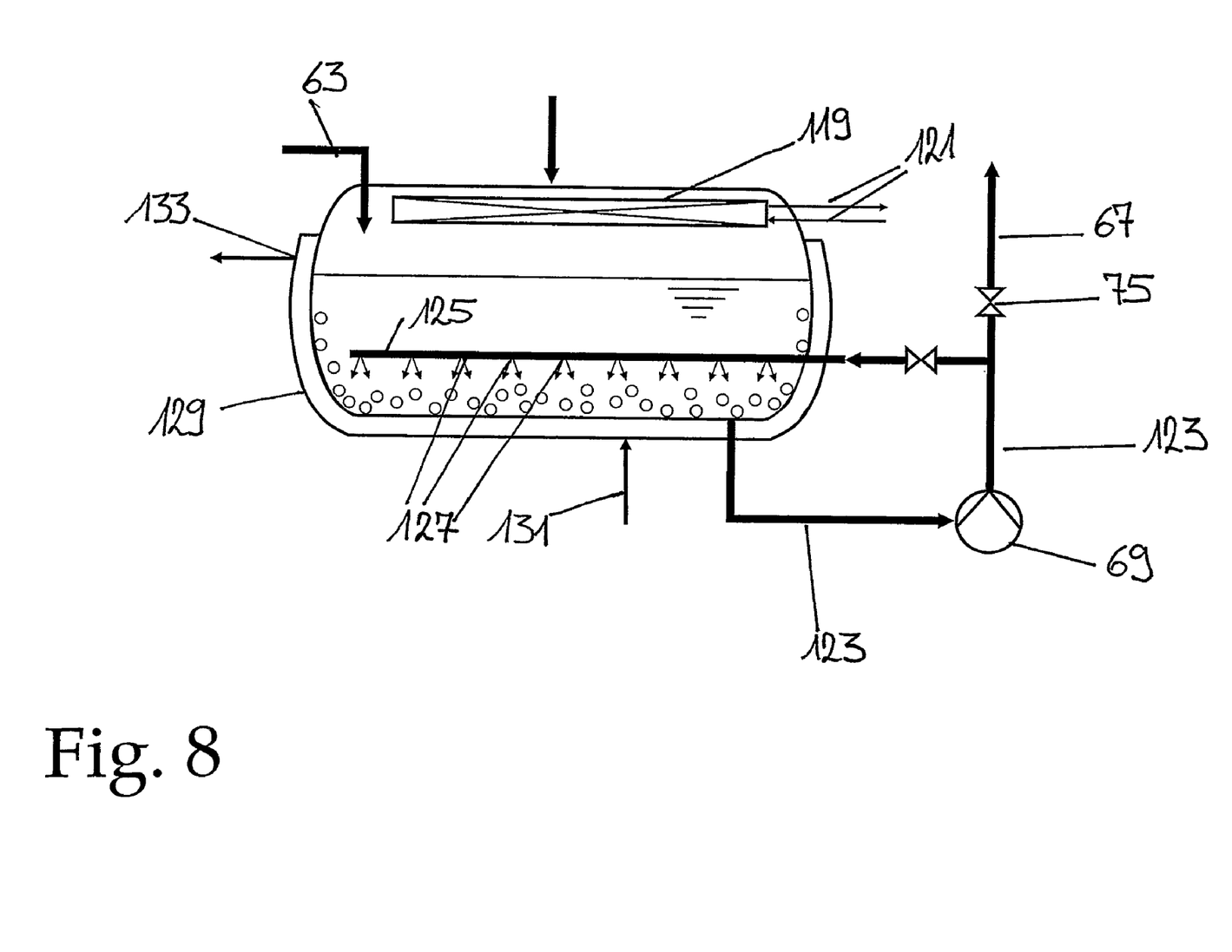
FIG. 8 shows the receiver in FIG. 7 with heated heating jacket.
Figure 9:
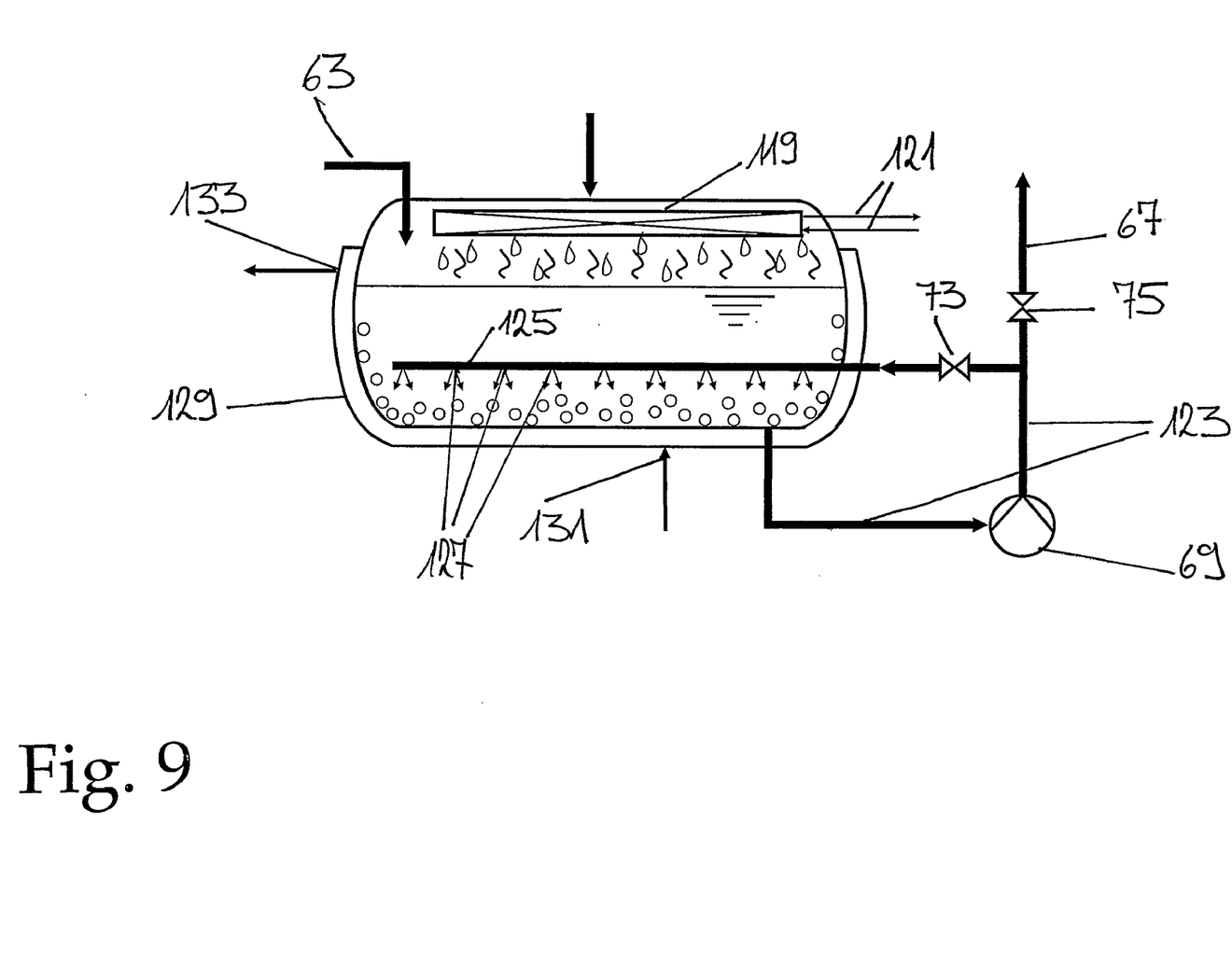
FIG. 9 Shows the receiver in FIG. 7 during operation.

Receiver vessel 61 shown in FIGS. 7 to 9 is equipped with a condenser 119 which serves to condense evaporating solvent during the dissolution of the introduced raw product. Condenser 119 is provided with connecting pipes 121 through which a cooling medium or refrigerant can be circulated.

A circulation line 123 and a distribution pipe 125 enable the liquid mixture to be pumped around during operation, especially during the dissolving operation. Distribution pipe 125 has a plurality of downwards or sideward directed openings 127 through which circulated solution is distributed within the receiver vessel 61. Distribution pipe 125 extends a short distance from bottom 126 of the receiver so that the liquid mixture can be moved, particularly in the sump of the tank.

A further particular feature of receiver 61 is that it is equipped with a heating jacket 129. Thermal energy can be supplied to receiver 61 in a controlled manner by means of heating jacket 129. Heating jacket 129 is preferably designed as a double jacket 131 through which a heat transfer medium is circulated. In bottom 126 the double jacket has one or more inlet opening(s) 131 for feeding a heat transfer medium, and in upper peripheral region it has one or more outlet opening(s) 133 for discharging the heat transfer medium. Heating energy is supplied by circulating a heat transfer medium from bottom to top in the heating jacket so that the solvent slightly boils at the vessel walls (bubbling; see FIG. 8). Bubbling that is induced by that slight boiling is sufficient to generate a turbulent agitation accelerates the dissolution of the mixture to be purified, and especially the raw product flakes that may be created during the dissolving operation an that tend to sink towards the bottom of the vessel. FIG. 9 shows how evaporating solvent is condensed on condenser 119 and drips back into the bulk of the liquid.

The receiver may have the following characteristics:
The jacket can be heated by means of steam or a liquid heat transfer medium.
The jacket may be of the conventional type (double wall) or of a dimpled jacket or embossed plate type.
It is important to have as uniform a temperature distribution as possible on the inner wall of the receiver vessel when the solvent is boiling so as to obtain a uniform bubbling over the entire wetted parts of the vessel walls. The use of hot steam is advantageous because it distributes uniformly throughout the jacket. Accordingly no special precautions, such as guide plates, etc., are required in the jacket.

When a liquid heat transfer medium is used, it must be conducted throughout the wall surface. This is achieved by means of suitably designed baffles or similar measures.

The advantage of liquid heat transfer medium is: The boiling point of the solvent (which is pressure dependent) increases in the direction from the surface down to the tank bottom due to fact that the hydrostatic pressure rises as the depth increases. The heat transfer medium is therefore advantageously fed into the jacket at the vessel bottom and is discharged at the top. Its temperature drops because the heat transfer medium gives off heating energy to the boiling solvent (in contrast to this steam condenses everywhere at the same temperature); the mass throughput of the heat transfer medium can be set so that its temperature decreases by the same amount (on its way from the inlet to the outlet of the heat jacket) as the boiling point of the solvent from the bottom of the tank to its surface; this ensures that extremely uniform heat input and so a very uniform bubbling is achieved over the entire heated wall surface.

General Description of the Method:

I. Preparation

The raw mixture to be purified is kept liquid in tank T-2 at a temperature above the solidification point. Temperatures above the solidification point, preferably approx. 10 to 15° C. above the solidification point, are suitable.

In tank T-1 the solvent, ethanol, for example, is kept at a temperature suitable for subsequent receiving of the mixture to be crystallised (see below, II.2.). The ethanol may be returned partially or fully from a recovery process. Tank T-1 is equipped at the top with cooling surfaces (condenser) which are cooled with chilled or cooling water and prevent the solvent from evaporating from the tank.

II. Receiving of the Solvent

A suitable quantity of the solvent (measured, for example, by filling level measurement in tank T-3 or in tank T-1, or by weighing in tanks T-1 and/or T-3, or by flow measurement) is transferred into tank T-3. Depending on the arrangement of the tanks, the transfer may take place by gravity (opening of the drain valve on T-1) or by means of a pump (not shown).

The solvent is circulated with pump P-3 in the short circuit (valve 75 closed, valve 73 open). The raw mixture is now added to the solvent with pump P-2. The flow rate through P-2 is chosen so that there is no sudden evaporation of the circulated solvent. With the condenser attached (e.g. cooling with cooling water), evaporation of the solvent from the tank is prevented. The condensed solvent flow also reduces boiling on the surface of the solvent mixture in tank T-3. The quantity of raw mixture added is measured and controlled by suitable means (see 1 above)—filling level measurement, or by weighing on tank T-3 and/or T-2, or by measuring and totaling the flow of the raw mixture.

III. Crystallisation

The received solution is pumped into the crystalliser with pump P-3. A static or dynamic (e.g. falling film) crystalliser may be used for crystallization. The preferred crystallising of the substance to be purified is achieved by programmed lowering of the temperature in the crystalliser (cooling/heating circuit with tempered heat transfer medium). The (optional) cooling surfaces in the upper section of the crystalliser (e.g. cooling by cooling water) prevent the solvent vapour from escaping by condensation and returning the condensed solvent to the crystalliser. The crystallisation is terminated after a prescribed quantity of the substance used has crystallised out. This quantity may be monitored by conventional methods during crystallisation, e.g. level measurement in the collector tank of a falling film crystalliser, or by crystallisation with a defined temperature regulation within a defined period of time.

IV. Draining of the Residual Solution and Condensation

The non-crystallised residual solution, which contains concentrated impurities (undesired substances), is drained into tank T-5.

The crystal mass is sweated in the crystalliser by slow heating up (controlled temperature regulation). The sweating fraction can then continue draining into tank T-5. The sweat quantity is determined by weighing in tank T-5 or in the crystalliser (each device being installed on weighing cells) or by level measurement in tank T-5. The second cut of the sweating fraction is drained into tank T-3 (the sweating fractions are always drained by gravity), where it is added to the mixture used for crystallisation in the next crystallisation cycle. If the crystallised fraction is to be recrystallised for further purification (in a further crystallisation stage), the second cut of the sweating fraction is fed into intermediate tank T-4, where it is stored intermediately. However, the sweating fraction can consist of only one cut, according to the separating behaviour of the purified mixture, and this fraction can either be added to the residual solution in tank T-5 or drained into tank T-3 or T-4, depending on the composition of the residual solution.

Uncontrolled escape of the solvent is prevented by cooling the condensation surfaces in the upper section of the crystalliser.

The solvent-rich residual solution in tank T-5 can be fed to a suitable process for partial or complete solvent recovery.

V. Melting the Crystals

The temperature is now increased for melting the crystals.

If the crystallised fraction is already the purified final product, the temperature is increased to a suitable value at which the controlled (i.e. not too sudden) evaporation of the solvent still present in the crystal mass is achieved. The cooling on the condensation surfaces in the crystalliser is switched off. The evaporated solvent is fed through a pipe 51 to solvent tank T-1 and is condensed there in the condenser provided on the tank. The evaporation of the solvent in the crystalliser may, for example, be monitored by temperature measurement in the product space of the crystalliser. A substantial rise in temperature inside the crystalliser is an indication that all the solvent has been evaporated. The temperature of the heat carrier is then increased to a suitable value above the melting point of the solvent-free product in order to melt the remaining crystals. The molten mass is then drained into tank T-6 as the final product.

If the crystallised fraction is to be recrystallised in a further crystallisation stage, an established quantity of solvent is transferred to T-3 during sweating.

The sweated crystallisate can be melted as described above, but the crystals can also be dissolved by the method described in the following. The temperature in the crystalliser is kept at a suitable value at which no substantial evaporation of the solvent, especially no boiling, takes place, by a suitable choice of temperature of the heat transfer medium. The drain valves from the crystalliser to T-3 are opened. The solvent is pumped from T-3 to the crystalliser with pump P-3 and there guided, preferably sprayed, on the crystals. The spraying devices should guarantee distribution of the sprayed solvent over the entire cross-sectional area of the crystalliser occupied by the crystals. For example, liquid distributors may be used such as those already known the distillation columns. The crystals are then dissolved by the sprayed on solvent. The liquid mass continuously drains from the crystalliser to T-3 as long as pump P-3 remains switched on. The melting of the crystals may take place, for example, by weighing the crystalliser or tank T-3 (installation on weighing cells) or by filling level measurement in T-3. An indication of complete dissolution of the crystals may, for example, be the attainment of a defined value of the measured quantity (weight or level) or that this quantity remains at a level that no longer varies over a defined time. However, it is also conceivable to carry out the melting over a defined, adequately dimensioned time without weight or level monitoring at defined parameters (flow rate of the solvent circulated with P-3, temperature).

As soon as the crystal layer has been dissolved, pump P-3 is switched off. In receiver T-3 there is now a solution ready for (re) crystallisation in the next crystallisation stage. The established quantity of solvent that has been received during condensation in T-3 is chosen so that after the crystals are dissolved, the solution ready for the subsequent (re) crystallisation represents the desired proportion of the solvent. Throughout the dissolving process, the escape of the solvent vapour is prevented by condensation on the cooling surfaces in the upper section of the crystalliser.

VI. (Re-)Crystallisation in the Next Stage

The mixture in receiver T-3, which contains a higher concentration of the desired compound than the initial mixture, is now pumped into the crystalliser with pump P-3. The crystallisation is carried out in a similar manner to the previous stage (see III.1.). During crystallisation the sweating fraction stored intermediately in intermediate tank T-4 is drained or pumped from the previous stage into T-3 (pump not shown here). A suitable solvent quantity is transferred from solvent tank T-1 to T-3 and a suitable quantity of the raw mixture is added from T-2 (see II.1. and 2.). Here "suitable" means that the quantity of mixture from intermediate tank T-4, the quantity of solvent from solvent tank T-1, the quantity of raw mixture from T-2 and the quantity of uncrystallised solution from this stage (see below), if necessary with the first cut of the sweating fraction from this stage, return a mass and solvent content of the mixture suitable for the subsequent crystallisation process, after all these quantities are mixed together.

VII. Draining of the Residual Solution and Condensing

The non-crystallised residual solution from the second stage is drained into tank T-3. The first cut of the sweating fraction is added to this residual solution if necessary. Both steps are carried out as described in IV, except that the residual solution and, if necessary, the first part of the sweating fraction, are fed to T-3 instead of T-5. A second part of the sweating fraction is intermediately stored, if necessary, in intermediate tank T-4 and is added immediately before, during or immediately after dissolution of the crystals for the feed stage in the sub sequent crystallisation cycle (the stage with the raw mixture, see above in point V 3.).

VII. Melting of the Crystals

The melting of the crystals is carried out as described in V.2.

If a further (re) crystallisation stage is provided, the melting, as described in V 1., and all further process steps are carried out correspondingly as described in VI to VIII.

The solution is mixed under the following conditions:

Almost pressure-less operation—the pressure is equal to the working gauge pressure of the crystalliser and is therefore less than 100 mbars, preferably less than 50 mbars, e.g. when a static crystalliser is used.

The boiling point of the solvent (at working pressure) may be far below the solidification point of the raw mixture to be dissolved. For example, if sitosterol is purified with ethanol as the solvent, the boiling point of the ethanol is approx. 78-80° C., and the solidification points of the product fractions to be dissolved are approx. 90-110° C.

The use of agitators is largely dispensed with because they contain mechanically moved parts and are more prone to faults than other components of the system (the seals of the agitator shaft are regarded as particular weak points).

Process of the Dissolution of the Raw Product or Compound Mixture to be Purified The solvent is first heated in the tank almost to its boiling temperature. Heat is then supplied in a controlled manner into the tank to allow gentle boiling of the solvent.

The gently boiling solvent is circulated with pump 69. The essentially solvent-free, molten raw product is then dosed.

The raw product partially dissolves but tends to flocculate due to rapid cooling on contact with the solvent, particularly if its solidification point is above the boiling point of the solvent. The flakes sink and tend to accumulate in regions of the tank close to the bottom and adhere partially to the bottom and wall of the tank.

During the gentle boiling, bubbles of the solvent vapour form on the jacket heated inner walls of the receiver; these bubbles cause local turbulent movement and mixing of the solvent in the vicinity of the bottom and wall, i.e. close to all the jacket-heated surfaces in the tank, as a result of which the product flakes are dissolved very quickly; this is particularly important in the lower section/on the bottom of the tank because the flakes tend to accumulate there.

The boiling solvent is condensed on the cooling surfaces in the upper section of the tank and is returned to the bulk of liquid.

Because of the simultaneous circulation of the solution with the pump, two things are achieved:
 a) Homogenisation of the concentrations throughout the volume of the solution:
 b) Avoidance of accumulations of flocs in heaps or lumps due to maintenance of movement of the tank content The heating is then switched off so that boiling stops, and the solution is then pumped to the crystalliser.

Control of Energy Supply During Boiling

If steam is used, the steam flow can be measured and set, for example, to a predetermined amount by a throttling valve or it can be regulated to a defined flow value.

In the case of a liquid heat transfer medium, the feed temperature to the jacket can be set to a predetermined value; the supply and return temperatures of the heat transfer medium to/from the jacket can also be measured, and the feed temperature can then be regulated so that a predetermined temperature difference is maintained between the supply and return of the heat transfer medium.

Alcohols (methanol, ethanol, n-propanol, isopropanol, butanol or other higher value alcohols) and ketones (e.g. methyl ethyl ketone frequently used in industry) and mixtures thereof are preferably used as solvents for purifying sterols.
Advantages of the Method According to the Invention:

The method according to the invention provides the possibility of efficiently purifying raw material mixtures which tend to crystallise in an unfavourable crystal structure or tend to thermal decomposition during solvent-free purification by crystallisation.

Pressure-less operation of the system, or operating the system at low pressures, is possible due to the use of suitable cooling surfaces at suitable points in the system. This enables conventional crystallisers not suitable for a higher working pressure to be used (favourable classification according to the applicable pressure vessel regulations). Conventional crystallisers, which are equipped with additional cooling surfaces, may be used even when the boiling temperature of the solvent is below the melting temperature of the solvent-free product.

Expensive filtration or centrifuging steps and subsequent washing of the filtered or centrifuged crystallisate by additional solvent (quantities) are avoided by the application of layer crystallisation.

The new method is well suited for obtaining e.g. phytosterol in a quality, which meets the requirements of the food and pharmaceutical industry. Preferred raw materials for the purification method according to the invention are phytosterol concentrates, which are obtained as by-products in the processing of foods, cellulose or the like. Phytosterol is a collective term for vegetable sterols and relates both to sterols and stanols. The latter are the reduced counterparts of the vegetable sterols, which occur less frequently in nature. The most common vegetable sterols are sitosterol, camposterol, stigmasterol, avenasterol and brassicasterol. In addition the method according to the invention can also be used for purifying sterols of animal origin, such as cholesterol.

The device according to the invention is generally also (or "particularly") suitable for purifying compounds with a melting point >100 degrees Celsius. A raw product to be purified, also as melt, can be quickly dissolved through the use of a receiver vessel that can be heated under controlled conditions, without special agitating devices (stirrers) being required. The solution can also be simultaneously pumped around. The use of a condenser in the receiver enables high melting compounds to be dissolved in a low boiling solvent and to be subsequently crystallised out of that solvent.

EXAMPLE 1

In a pilot crystallization device, the following solution was prepared
Raw Sterol mixture, dry: 9240 g
Solvent: Ethanol: 45,300 g
Total Solution: 54,540 g
The solution at 78° C. was fed into a pilot static crystallizer that was pre-cooled to 72° C. After that, the heat transfer medium temperature was decreased to 30° C. within 6 hours and it was held at that value for 1 hour. Then the residual solution was drained for 2 hours. The sweating fraction was collected during 1.5 hours, the temperature was increased to 78° C. during that time.

The product fractions had the following figures

|  | FRACTION | | | |
|---|---|---|---|---|
|  | INPUT | RESIDUE | SWEAT | CRYSTALS (balanced) |
| TOTAL MASS | 54'540 | 42'630 | 1'870 | 10'000 |
| SOLVENT MASS | 45'300 | 37'490 | 1'355 | 6'455 |
| DRY MASS | 9'200 | 5140 | 515 | 3'545 |
| CONTENT STEROLS | 50.5% | 25.5% |  | 86.5% |

EXAMPLE 2

The crystal fraction of example 1 was diluted through the addition of solvent so as to obtain a solvent/dry mass ratio of approx. 10:1. The so prepared solution being at 78° C. was fed into the pilot crystallizer that was pre-cooled to 76° C. After that, the heat transfer medium temperature was decreased to 36° C. within 7 hours and it was held at that value for 1 hour. The residual solution was drained for 1.5 hours, the sweating fraction was collected during 1.5 hours, and the temperature was increased to 77° C. during sweating.

The product fractions yielded the following figures

|  | FRACTION | | | |
|---|---|---|---|---|
|  | INPUT | RESIDUE | SWEAT | CRYSTALS (balanced) |
| TOTAL MASS | 38'800 | 34'015 | 720 | 4'065 |
| SOLVENT MASS | 35'265 | 33'040 | 545 | 1'680 |
| DRY MASS | 3'535 | 975 | 175 | 2'385 |
| CONTENT STEROLS | 86.5% | 59.7% |  | 99.2% |

LEGEND

11 Crystallisation device
13 Static crystalliser
14 Dynamic crystallizer
15 Crystallisation space
17 First heat exchanger surfaces
19,21 Pipes
23 Cooling/heater surfaces
25,27,29 Feed units for heat transfer medium
26,28,30 Pipes
31 Valve
33 Valve
35 Valve
39 Bypass pipe
41 Valve of the bypass pipe
43 Control valve
45 Temperature measurement
47 Second heat exchanger surfaces
49 Second cooling circuit
51 Pipe between crystalliser and solvent tank
53 Solvent storage tank
55 Supply pipe
57 Condenser
59 Connecting pipe
61 Receiver vessel
63 Supply pipe
65 Raw product tank
67 Feed pipe 69 Pump
71 Pipe between feed pipe and receiver vessel 53
73,75 Valves
77 Collector pipe
80,81 Valves
83,84 Pipes
85 Tank for residue
87 Tank for end product
89 Pump
91 Shutoff valve
93 Valve for shutting off the pipe 79
95 Intermediate tank
98 Pipe
99 Valve
100 Pipe
101 Valve
103 Overflow pipe
105 Pipe system
107 Circulation pump
109 Pump
111 Sump of the dynamic crystalliser
113 Head of the dynamic crystalliser
115 Connection point of the condenser on the dynamic crystalliser
117
119 Condenser in the receiver
121 Connecting pipes of the condenser for a refrigerant
123 Pipes for circulation of the liquid mixture in the receiver
125 Distribution pipe
126 Bottom of the receiver
127 Openings of the distribution pipe
129 Heating jacket
131 First connection for heat transfer medium
133 Second connection for heat transfer medium

The invention claimed is:

1. A method for purifying a product containing sterols characterised by the following method steps:
dissolving the product in a solvent to form a solvent mixture for manufacturing a mixture of a desired composition,
bringing said solvent mixture into contact with first heat exchange surfaces and allowing said solvent mixture to cool slowly in a crystallisation process to form a crystal layer with a desired compound on the first heat exchange surfaces, and
therefafter melting of the crystal layer on the first heat exchange surfaces.

2. The method according to claim 1 characterised in that solvent evaporating during the crystallisation process is condensed and returned to said solvent mixture.

3. The method according to claim 1 characterised in that the product is dissolved in an excess of solvent or solvent mixture.

4. The method according to claim 1 characterised in that the product is dissolved in a solvent with a boiling point which is lower than the melting point of the desired compound.

5. The method according to claim 1 characterised in that the product is dissolved in a solvent with a boiling point which is higher than the melting point of the desired compound.

6. The method according to any one of claim 1 characterised in that the proportion of the product by weight in the mixture is less than 50%.

7. The method according to claim 1 characterised in that a predetermined weight of the product and a predetermined weight of the solvent added are dissolved together.

8. The method according to claim 1 characterised in that the solvent is received at a predetermined temperature and the product is heated and melted prior to introduction into the solvent.

9. The method according to claim 8 characterised in that the solvent mixture is agitated during the dissolving of the product.

10. The method according to claim 9 characterised in that solvent evaporating during the dissolution of the product is condensed and recycled.

11. The method according to claim 10 further characterised in the step of feeding sufficient thermal energy to the solvent mixture to boil the solvent mixture gently in a peripheral region thereof while effecting a turbulent mixing within the solvent mixture.

12. The method according to claim 11, characterised in that a heat transfer medium is guided in the heating jacket of a receiver so that the drop in temperature is compensated for by the variation in boiling point of the solvent, depending on depth and sufficient thermal energy is supplied to the solvent mixture for there to be a temperature gradient in the solvent mixture wherein solvent mixture becomes colder from bottom to top.

13. The method according to claim 12 characterised in that a liquid is circulated to assist in the mixing of the solvent and product to be dissolved.

14. The method according to claim 1 characterised in that after the crystallisation process the residue from the crystallisation process is drained and the solvent contained in the residue is recovered and fed to a solvent storage tank.

15. The method according to claim 14 characterised in that after recovery of the solvent, the remaining crystallisate is purified in a subsequent second crystallisation stage.

16. The method according to claim 1 characterised in that the melted crystal layer is mixed with a corresponding quantity of solvent to produce a mixture with a composition suitable for subsequent crystallisation and is then purified in a second crystallisation stage.

17. The method according to claim 16 characterised in that a condensing fraction from the second crystallisation stage is stored intermediately and later mixed together with fresh product and solvent and purified in a further crystallisation stage.

18. The method according to claim 17 characterised in that the melted crystal layer is mixed with a corresponding quantity of solvent to produce a mixture with a composition suitable for subsequent crystallisation and is then purified in a second crystallisation stage.

19. The method according to claim 1 characterised in that one of cooling water and water vapor is fed through the heat exchanger surfaces via a primary cooling/heating circuit connected to the first heat exchanger surfaces.

20. The method according to claim 1 characterised in that said steps are repeated until the desired purity of the product is achieved.

21. The method according to claim 1 wherein the product contains phytosterols.

22. The method according to claim 1 characterised in that the solvent is any one of methanol, ethanol, propanol, methyl ethyl ketone and a mixture thereof.

23. The method according to claim 1 characterised in that the crystal layer on the first heat exchange surfaces drips therefrom during said melting step.

24. The method according to claim 1 characterised in that the solvent mixture contains at least one of phytosterol, beta-sitosterol and stanol to be crystallized as desirable compounds and at least one of campestanes, sitostanes, campestanones, sitostanones, fatty alcohols, alpha sterols, fatty acids and chromatogenous components to be separated as undesirable compounds.

25. The method according to claim 1 characterised in that the product contains a compound selected from the group consisting of at least one of beta-sitosterol, stanol, phytostanol, and sterols of animal origin, and in that the crystal layer contains said compound.

26. A method for cleaning and/or separating raw products and compound mixtures with a high melting point by fractionated crystallisation, with the following method steps:
   dissolving the raw product in a solvent or solvent mixture for manufacturing a mixture with a desired composition,
   bringing the mixture into contact with first heat exchanger surfaces and allowing it to cool slowly so that a crystal layer is formed on the first cooling surfaces with the desired compound, and
   fractionated melting of the crystal layer after the crystallisation process characterised in that solvent evaporating during the crystallisation process is condensed and returned to the mixture.

27. The method according to claim 26, characterised in that the dissolution of the raw product takes place by controlled boiling of the solvent with simultaneous circulation of the solvent.

28. The method according to claim 1 characterised in that solvent evaporating during the crystallisation process is condensed and returned to the mixture.

29. A device for cleaning and/or separating raw products or compound mixtures by fractionated crystallisation comprising
   a crystalliser with first heat exchanger surfaces through which a heat transfer medium is able to flow,
   at least a first tank for receiving the raw product,
   at least a second tank for storing the end product or product fractions, and
   pipes for feeding a raw product to be cleaned to the crystalliser and for transferring the purified product to the second tank,
   a receiver,
   a solvent storage tank,
   a supply pipe connecting said first tank to said receiver, and pipes connecting said solvent storage tank to said receiver and to said crystalliser.

30. The device according to claim 29 further comprising second heat exchanger surfaces connected to said crystalliser.

31. The device according to claim 30 characterised in that said second heat exchanger surfaces are arranged in said crystalliser.

32. The device according to claim 30 characterised in that said second heat exchanger surfaces are disposed outside said crystalliser.

33. The device according to claim 29 further comprising a condenser on said receiver.

34. The device according to claim 29 further comprising a heating jacket in said receiver.

35. The device according to claim 34 wherein said heating jacket has a first connection on a bottom thereof and a second connection in an upper peripheral region thereof for circulating a heat transfer medium therethrough.

36. The device according to claim 29 further comp-rising a condenser on said solvent storage tank.

37. The device according to claim 29 further comprising a primary cooling/heating circuit connected to said first heat exchanger surfaces, said cooling/heating circuit having at least a first and a second heating/refrigeration unit therein.

38. The device according to claim 37 wherein said primary cooling/heating circuit has three heating/refrigeration units including a first heating/refrigeration unit for producing cooling water of a first low temperature, a second heating/refrigeration unit for producing cooling water of a second medium temperature higher than said low temperature, and a third heating/refrigeration unit for producing water vapor of a third high temperature.

39. An apparatus comprising
   a crystalliser having first heat exchanger surfaces through which a heat transfer medium is able to flow,
   at least a first tank for receiving a raw product
   at least a second tank for storing at least one of an end product and product fractions,
   pipes for supplying the raw product to said crystalliser and for transferring the crystallised product to the second tank,
   a receiver,
   a heating jacket at least partially enclosing said receiver for heating liquid received in said receiver, and
   a condenser for condensing evaporating solvent in said receiver.

* * * * *

UNITED STATES PATENT AND TRADEMARK OFFICE
CERTIFICATE OF CORRECTION

| | | |
|---|---|---|
| PATENT NO. | : 8,056,362 B2 | Page 1 of 1 |
| APPLICATION NO. | : 11/988627 | |
| DATED | : November 15, 2011 | |
| INVENTOR(S) | : Rodolfo Rohr et al. | |

It is certified that error appears in the above-identified patent and that said Letters Patent is hereby corrected as shown below:

Column 5
Lines 13-14, "according to the preamble of claim 29" to -- for purifying and/or separating raw products or compound mixtures by fractional crystallisation --

Column 6
Lines 7-8 cancel "according to Claim 27,"

Signed and Sealed this
Third Day of January, 2012

David J. Kappos
*Director of the United States Patent and Trademark Office*